US012763465B2

(12) United States Patent
Chang et al.

(10) Patent No.: US 12,763,465 B2
(45) Date of Patent: Oct. 13, 2026

(54) MOBILE DEVICE SUPPORTING WIDEBAND OPERATION

(71) Applicant: Acer Incorporated, New Taipei City (TW)

(72) Inventors: Kun-Sheng Chang, New Taipei City (TW); Ching-Chi Lin, New Taipei City (TW)

(73) Assignee: ACER INCORPORATED, New Taipei City (TW)

(*) Notice: Subject to any disclaimer, the term of this patent is extended or adjusted under 35 U.S.C. 154(b) by 23 days.

(21) Appl. No.: 18/983,711

(22) Filed: Dec. 17, 2024

(65) Prior Publication Data

US 2026/0128516 A1 May 7, 2026

(30) Foreign Application Priority Data

Nov. 5, 2024 (TW) ................................ 113142216

(51) Int. Cl.
*H01Q 5/20* (2015.01)
*H01Q 1/22* (2006.01)
*H01Q 9/04* (2006.01)

(52) U.S. Cl.
CPC ............. *H01Q 5/20* (2015.01); *H01Q 1/2266* (2013.01); *H01Q 9/0421* (2013.01)

(58) Field of Classification Search
CPC ............ H01Q 1/48; H01Q 1/52; H01Q 1/243; H01Q 1/245; H01Q 1/2266; H01Q 5/40;
(Continued)

(56) References Cited

U.S. PATENT DOCUMENTS 7,425,924 B2 * 9/2008 Chung .................. H01Q 5/371 343/702
8,547,283 B2 * 10/2013 Wong .................. H01Q 9/0421 343/702
(Continued)

FOREIGN PATENT DOCUMENTS

TW M665490 U 1/2025

OTHER PUBLICATIONS

Chinese language office action dated Jun. 23, 2025, issued in application No. TW 113142216.

*Primary Examiner* — Tung X Le
(74) *Attorney, Agent, or Firm* — McClure, Qualey & Rodack, LLP

(57) ABSTRACT

A mobile device includes a feeding radiation element, a first radiation element, a shorting radiation element, a second radiation element, a third radiation element, and a fourth radiation element. The feeding radiation element has a feeding point. The first radiation element is adjacent to the feeding radiation element. The first radiation element is coupled through the shorting radiation element to a ground voltage. The second radiation element is coupled to the shorting radiation element. The third radiation element is coupled to the first radiation element. The third radiation element is adjacent to the feeding radiation element. The fourth radiation element is coupled to the ground voltage. The fourth radiation element is adjacent to the feeding radiation element. An antenna structure is formed by the feeding radiation element, the first radiation element, the shorting radiation element, the second radiation element, the third radiation element, and the fourth radiation element.

14 Claims, 4 Drawing Sheets

(58) Field of Classification Search
CPC ........ H01Q 5/371; H01Q 5/378; H01Q 5/385; H01Q 9/42; H01Q 21/28; H01Q 21/30
See application file for complete search history.

(56) References Cited

U.S. PATENT DOCUMENTS

| | | | | |
|---|---|---|---|---|
| 11,757,176 | B2 * | 9/2023 | Chuang .................. | H01Q 5/371<br>343/700 R |
| 12,567,667 | B2 * | 3/2026 | Yao ........................ | H01Q 5/378 |
| 2019/0198975 | A1 * | 6/2019 | Chen ........................ | H01Q 9/42 |
| 2021/0167499 | A1 * | 6/2021 | Tseng ..................... | H01Q 5/385 |
| 2024/0195082 | A1 * | 6/2024 | Lo .......................... | H01Q 5/378 |

* cited by examiner

MOBILE DEVICE SUPPORTING WIDEBAND OPERATION

CROSS REFERENCE TO RELATED APPLICATIONS

This application claims priority of Taiwan Patent Application No. 113142216 filed on Nov. 5, 2024, the entirety of which is incorporated by reference herein.

BACKGROUND OF THE INVENTION

Field of the Invention

The disclosure generally relates to a mobile device, and more particularly, to a mobile device supporting wideband operations.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has too narrow operational bandwidth, it may degrade the communication quality of the relative mobile device. Accordingly, it has become a critical challenge for designers to design a small-size, wideband antenna structure.

BRIEF SUMMARY OF THE INVENTION

In an exemplary embodiment, the invention is directed to a mobile device supporting wideband operations. The mobile device includes a feeding radiation element, a first radiation element, a shorting radiation element, a second radiation element, a third radiation element, and a fourth radiation element. The feeding radiation element has a feeding point. The first radiation element is adjacent to the feeding radiation element. The first radiation element is coupled through the shorting radiation element to a ground voltage. The second radiation element is coupled to the shorting radiation element. The third radiation element is coupled to the first radiation element. The third radiation element is adjacent to the feeding radiation element. The fourth radiation element is coupled to the ground voltage. The fourth radiation element is adjacent to the feeding radiation element. An antenna structure is formed by the feeding radiation element, the first radiation element, the shorting radiation element, the second radiation element, the third radiation element, and the fourth radiation element.

In some embodiments, the feeding radiation element includes a first portion and a second portion, and an obtuse angle is formed between the first portion and the second portion.

In some embodiments, the first radiation element further includes a trapezoidal widening portion.

In some embodiments, a first coupling gap is formed between the second portion of the feeding radiation element and the trapezoidal widening portion of the first radiation element. A second coupling gap is formed between the first portion of the feeding radiation element and the third radiation element. The width of each of the first coupling gap and the second coupling gap is from 0.5 mm to 1.5 mm.

In some embodiments, a third coupling gap is formed between the second portion of the feeding radiation element and the fourth radiation element. The width of the third coupling gap is from 0.5 mm to 1 mm.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the total length of the first radiation element and the shorting radiation element is substantially equal to 0.25 wavelength of the first frequency band.

In some embodiments, the total length of the first radiation element, the shorting radiation element and the second radiation element is substantially equal to 0.5 wavelength of the second frequency band.

In some embodiments, the length of the feeding radiation element is substantially equal to 0.5 wavelength of the third frequency band.

In some embodiments, the length of the fourth radiation element is substantially equal to 0.25 wavelength of the third frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
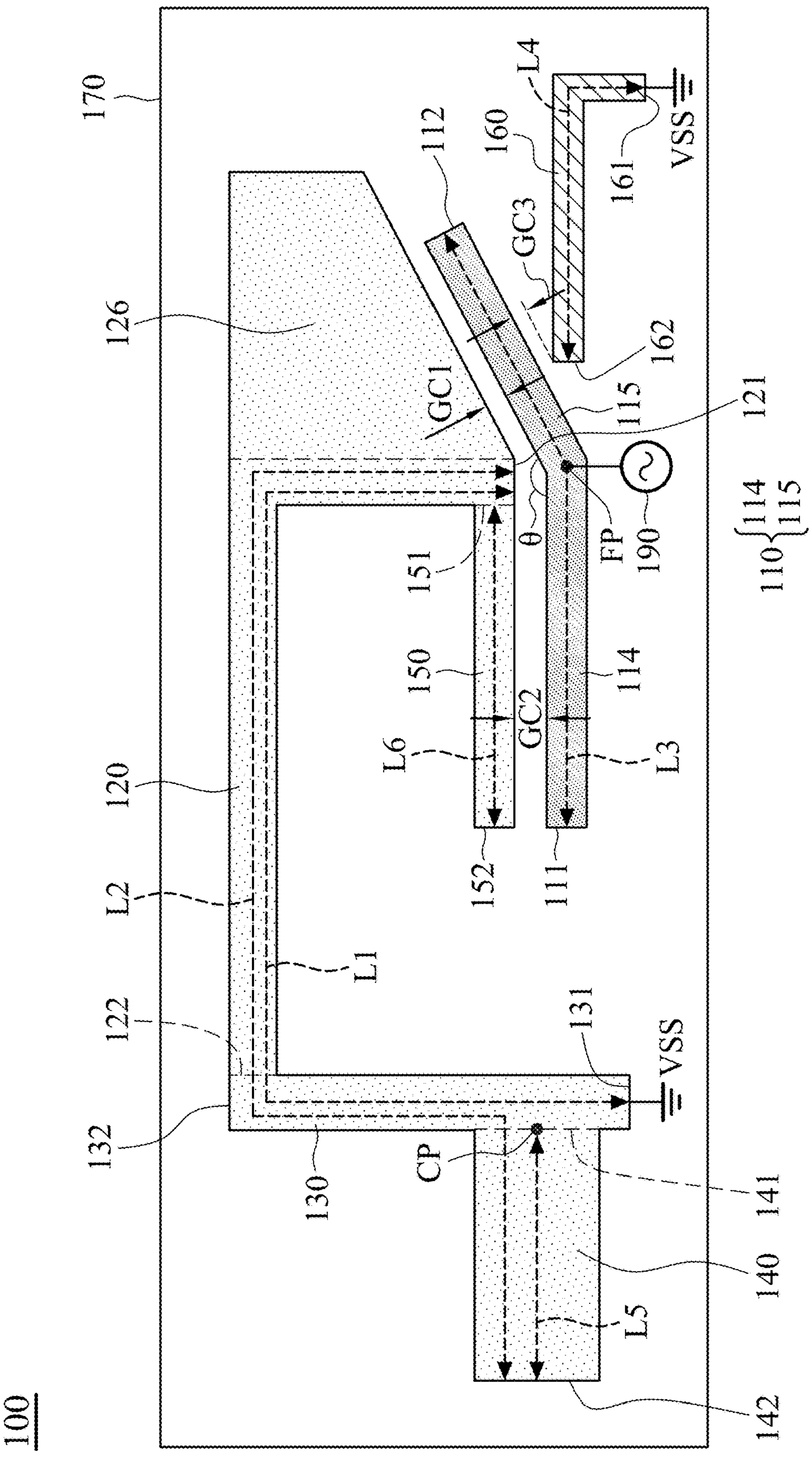
FIG. 1 is a top view of a mobile device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of a mobile device 100 according to an embodiment of the invention. For example, the mobile device 100 may be a smartphone, a tablet computer, or a notebook computer. In the embodiment of FIG. 1, the mobile device 100 at least includes a feeding radiation element 110, a first radiation element 120, a shorting radiation element 130, a second radiation element 140, a third radiation element 150, and a fourth radiation element 160. The feeding radiation element 110, the first radiation element 120, the shorting radiation element 130, the second radiation element 140, the third radiation element 150, and the fourth radiation element 160 may all be made of metal materials, such as copper, silver, aluminum, iron, or their alloys. It should be understood that the mobile device 100 may further include other components, such as a processor, a touch control panel, a speaker, a power supply module, and/or a housing, although they are not displayed in FIG. 1.

The feeding radiation element 110 may substantially have a V-shape. Specifically, the feeding radiation element 110 has a first end 111 and a second end 112, each of which may be an open end. A feeding point FP may be positioned at the central bending point of the feeding radiation element 110. The feeding point FP may be further coupled to a signal source 190. For example, the signal source 190 may be an RF (Radio Frequency) module. In some embodiments, the feeding radiation element 110 includes a first portion 114 and a second portion 115, and they substantially have the same lengths. In addition, an obtuse angle θ may be formed between the first portion 114 and the second portion 115 of the feeding radiation element 110.

The first radiation element 120 may substantially have a variable-width L-shape. Specifically, the first radiation element 120 has a first end 121 and a second end 122, and further includes a trapezoidal widening portion 126 positioned at the first end 121. In some embodiments, the first radiation element 120 is adjacent to the feeding radiation element 110. A first coupling gap GC1 may be formed between the second portion 115 of the feeding radiation element 110 and the trapezoidal widening portion 126 of the first radiation element 120. It should be noted that the term "adjacent" or "close" over the disclosure means that the distance (spacing) between two corresponding elements is smaller than a predetermined distance (e.g., 5 mm or shorter), but often does not mean that the two corresponding elements directly touch each other (i.e., the aforementioned distance/spacing between them is reduced to 0).

The shorting radiation element 130 may substantially have a relatively narrow straight-line shape. Specifically, the shorting radiation element 130 has a first end 131 and a second end 132. The first end 131 of the shorting radiation element 130 is coupled to a ground voltage VSS. The second end 132 of the shorting radiation element 130 is coupled to the second end 122 of the first radiation element 120. That is, the first radiation element 120 is coupled through the shorting radiation element 130 to the ground voltage VSS. For example, the ground voltage VSS may be provided by a system ground plane (not shown) of the mobile device 100, and it may be implemented with a ground copper foil.

The second radiation element 140 may substantially have a relatively wide straight-line shape (compared with the shorting radiation element 130), which may be substantially perpendicular to the shorting radiation element 130. Specifically, the second radiation element 140 has a first end 141 and a second end 142. The first end 141 of the second radiation element 140 is coupled to a connection point CP on the shorting radiation element 130. The second end 142 of the second radiation element 140 is an open end. For example, the aforementioned connection point CP may be very close to the first end 131 of the shorting radiation element 130, but it is not limited thereto.

The third radiation element 150 may substantially have another relatively narrow straight-line shape (compared with the second radiation element 140). Specifically, the third radiation element 150 has a first end 151 and a second end 152. The first end 151 of the third radiation element 150 is coupled to the first end 121 of the first radiation element 120. The second end 152 of the third radiation element 150 is an open end. For example, the second end 142 of the second radiation element 140 and the second end 152 of the third radiation element 150 may substantially extend in the same direction. In some embodiments, the third radiation element 150 is adjacent to the feeding radiation element 110. A second coupling gap GC2 may be formed between the first portion 114 of the feeding radiation element 110 and the third radiation element 150.

The fourth radiation element 160 may substantially have an equal-width L-shape. Specifically, the fourth radiation element 160 has a first end 161 and a second end 162. The first end 161 of the fourth radiation element 160 is coupled to the ground voltage VSS. The second end 162 of the fourth radiation element 160 is an open end. For example, the second end 152 of the third radiation element 150 and the second end 162 of the fourth radiation element 160 may substantially extend in the same direction. In some embodiments, the feeding radiation element 110 is disposed between the fourth radiation element 160 and each of the first radiation element 120 and the third radiation element 150. In some embodiments, the fourth radiation element 160 is adjacent to the feeding radiation element 110. A third coupling gap GC3 may be formed between the second portion 115 of the feeding radiation element 110 and the second end 162 of the fourth radiation element 160.

In some embodiments, the mobile device 100 further includes a dielectric substrate 170. For example, the dielectric substrate 170 may be an FR4 (Flame Retardant 4) substrate, a PCB (Printed Circuit Board), or a FPC (Flexible Printed Circuit). The feeding radiation element 110, the first radiation element 120, the shorting radiation element 130, the second radiation element 140, the third radiation element 150, and the fourth radiation element 160 may all be disposed on the same surface of the dielectric substrate 170.

In a preferred embodiment, an antenna structure of the mobile device 100 is formed by the feeding radiation element 110, the first radiation element 120, the shorting radiation element 130, the second radiation element 140, the third radiation element 150, and the fourth radiation element 160. For example, the aforementioned antenna structure may be a planar antenna structure. However, the invention is not limited thereto. In alternative embodiments, the aforementioned antenna structure is modified to a 3D (Three-Dimensional) antenna structure.

Figure 2:
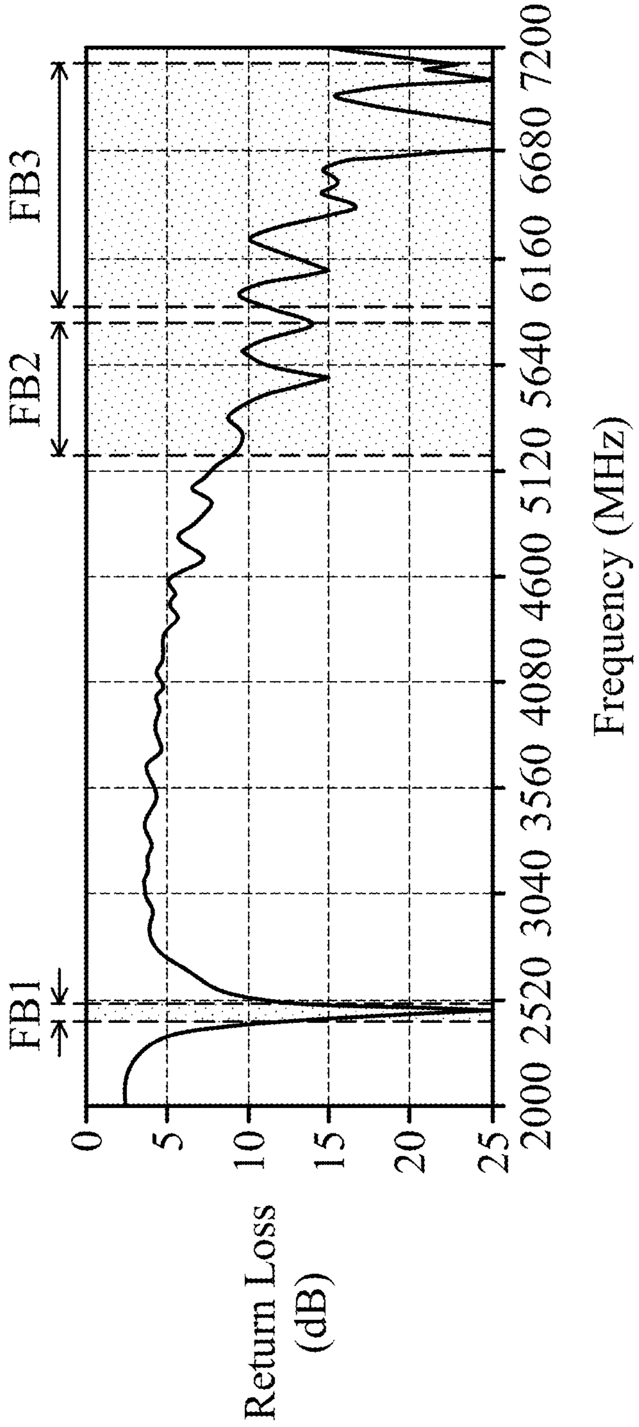
FIG. 2 is a diagram of return loss of an antenna structure of a mobile device according to an embodiment of the invention.

FIG. 2 is a diagram of return loss of the antenna structure of the mobile device 100 according to an embodiment of the invention. The horizontal axis represents the operational frequency (MHz), and the vertical axis represents the return loss (dB). According to the measurement of FIG. 2, the antenna structure of the mobile device 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the mobile device 100 can support at least the wideband operations of WLAN (Wireless Local Area Network), Wi-Fi 6E, and Wi-Fi 7.

In some embodiments, the operational principles of the antenna structure of the mobile device 100 will be described as follows. The first radiation element 120 and the shorting radiation element 130 can be excited to generate the first frequency band FB1. The first radiation element 120, the shorting radiation element 130, and the second radiation element 140 can be excited to generate the second frequency band FB2. The fourth radiation element 160 can be excited by the feeding radiation element 110 using a coupling mechanism, so as to generate the third frequency band FB3. The trapezoidal widening portion 126 of the first radiation element 120 can provide additional current paths, so as to increase the bandwidths of the first frequency band FB1 and the second frequency band FB2. The incorporation of the third radiation element 150 can further increase the coupling amount of the feeding radiation element 110. According to practical measurements, the proposed antenna structure of the mobile device 100 of the invention can help to suppress the interferences caused by nearby metal elements. Thus, it can be applied in a variety of complicated environments, and also maintain good communication quality.

Figure 3:
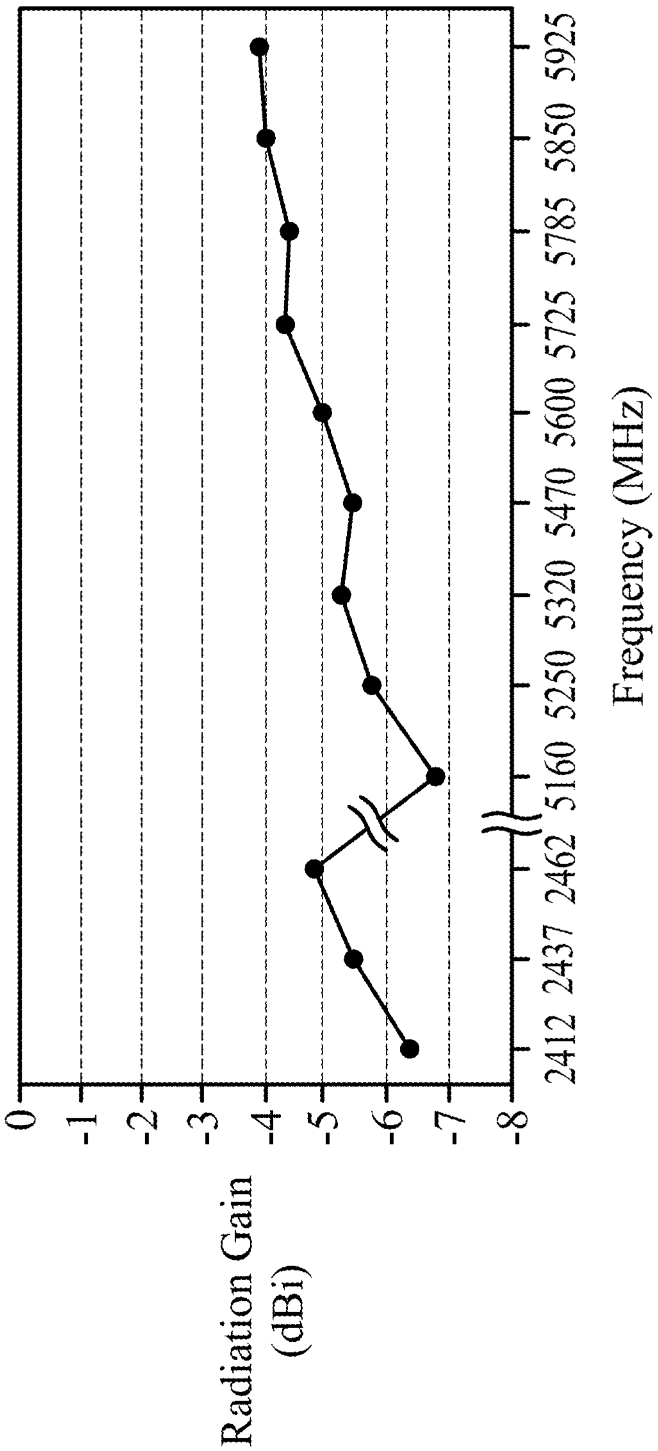
FIG. 3 is a diagram of radiation gain of an antenna structure of a mobile device according to an embodiment of the invention.

FIG. 3 is a diagram of radiation gain of the antenna structure of the mobile device 100 according to an embodiment of the invention. The horizontal axis represents the operational frequency (MHz), and the vertical axis represents the radiation gain (dBi). According to the measurement of FIG. 3, the radiation gain of the antenna structure of the mobile device 100 can reach −6 dBi or higher within the first frequency band FB1 and the second frequency band FB2 as mentioned above. It can meet the requirements of practical applications of general mobile communication devices.

In some embodiments, the element sizes of the mobile device 100 will be described as follows. The total length L1 of the first radiation element 120 and the shorting radiation element 130 may be substantially equal to 0.25 wavelength (λ/4) of the first frequency band FB1 of the antenna structure of the mobile device 100. The total length L2 of the first radiation element 120, the shorting radiation element 130, and the second radiation element 140 may be substantially equal to 0.5 wavelength (λ/2) of the second frequency band FB2 of the antenna structure of the mobile device 100. The length L3 of the feeding radiation element 110 may be substantially equal to 0.5 wavelength (λ/2) of the third frequency band FB3 of the antenna structure of the mobile device 100. The length L4 of the fourth radiation element 160 may be substantially equal to 0.25 wavelength (λ/4) of the third frequency band FB3 of the antenna structure of the mobile device 100. The length L5 of the second radiation element 140 may be from 5 mm to 7 mm. The length L6 of the third radiation element 150 may be substantially equal to 0.25 wavelength (λ/4) of the third frequency band FB3 of the antenna structure of the mobile device 100. The width of the first coupling gap GC1 may be from 0.5 mm to 1.5 mm, such as about 1 mm. The width of the second coupling gap GC2 may be from 0.5 mm to 1.5 mm, such as about 1 mm. The width of the third coupling gap GC3 may be from 0.5 mm to 1 mm, such as about 0.75 mm. The obtuse angle θ may be from 120 to 150 degrees, such as about 135 degrees. The above ranges of element sizes are calculated and obtained according to many experimental results, and they help to optimize the radiation gain, the impedance matching, and the operational bandwidth of the antenna structure of the mobile device 100.

Figure 4:
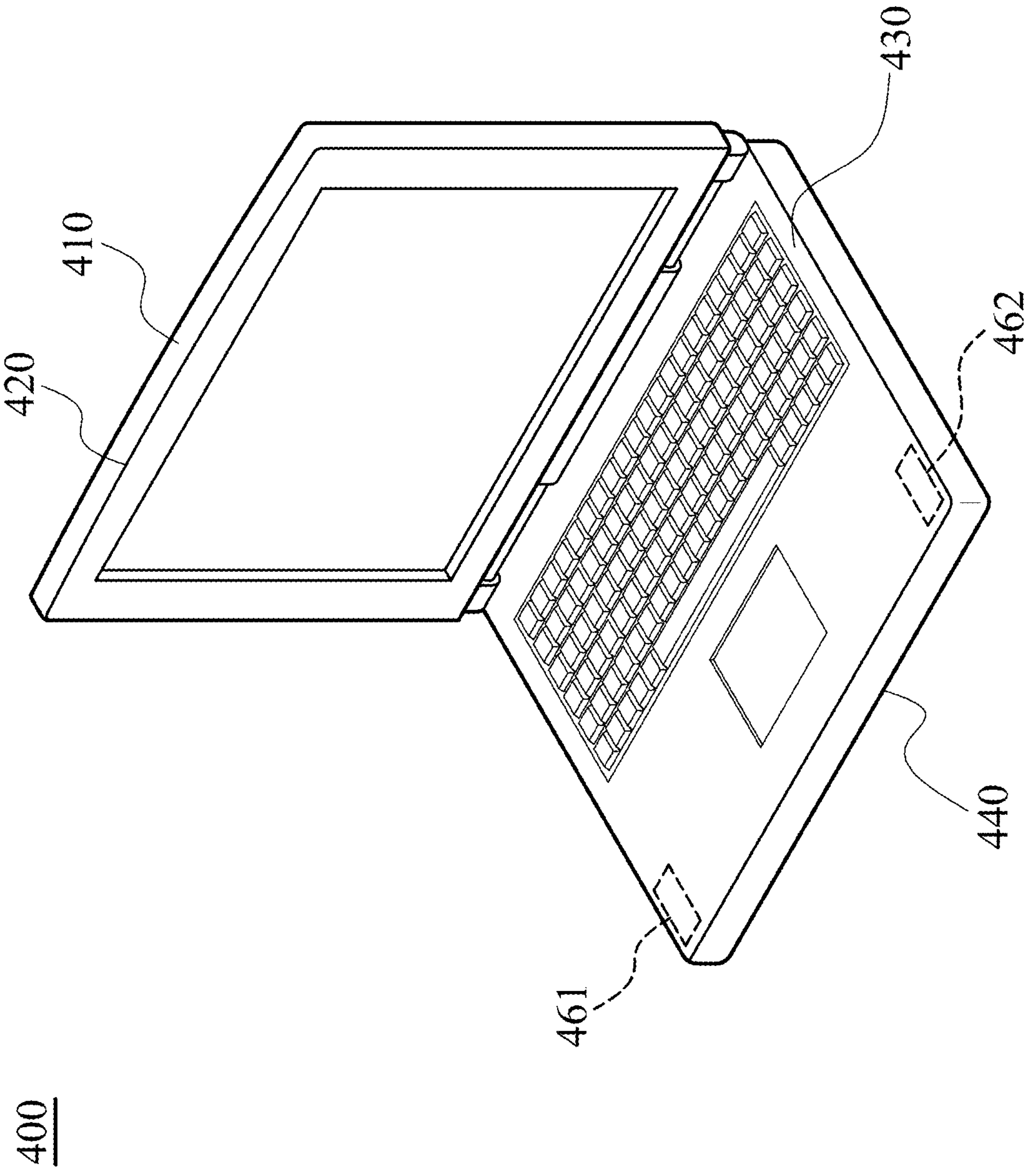
FIG. 4 is a perspective view of a notebook computer according to an embodiment of the invention.

FIG. 4 is a perspective view of a notebook computer 400 according to an embodiment of the invention. In the embodiment of FIG. 4, the aforementioned antenna structure is applied in the notebook computer 400. The notebook computer 400 includes an upper cover housing 410, a display frame 420, a keyboard frame 430, and a base housing 440. It should be understood that the upper cover housing 410, the display frame 420, the keyboard frame 430, and the base housing 440 are respectively equivalent to the so-called "A-component", "B-component", "C-component", and "D-component" in the field of notebook computers. For example, the keyboard frame 430 may be made of a non-conductive material, and the base housing 440 may be made of a metal material. In addition, the aforementioned antenna structure may be disposed between the keyboard frame 430 and the base housing 440, and may be adjacent to a first position 461 or a second position 462 of the notebook computer 400. According to practical measurements, such an arrangement can help to maintain the operational bandwidth of the aforementioned antenna structure, and also increase the probability that the notebook computer 400 passes the SAR (Specific Absorption Rate) test of regulations.

The invention proposes a novel mobile device with a novel antenna structure. In comparison to the conventional design, the invention has the advantages of small size, wide bandwidth, high radiation gain, and low SAR. Therefore, the invention is suitable for application in a variety of communication devices.

Note that the above element sizes, element shapes, and frequency ranges are not limitations of the invention. An antenna designer can fine-tune these settings or values according to different requirements. It should be understood that the mobile device of the invention is not limited to the configurations of FIGS. 1-4. The invention may merely include any one or more features of any one or more embodiments of FIGS. 1-4. In other words, not all of the features displayed in the figures should be implemented in the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device supporting wideband operations, comprising:

a feeding radiation element, having a feeding point;

a first radiation element, wherein the first radiation element is adjacent to the feeding radiation element;

a shorting radiation element, wherein the first radiation element is coupled through the shorting radiation element to a ground voltage;

a second radiation element, coupled to the shorting radiation element;

a third radiation element, coupled to the first radiation element, wherein the third radiation element is adjacent to the feeding radiation element; and a fourth radiation element, coupled to the ground voltage, wherein the fourth radiation element is adjacent to the feeding radiation element;

wherein an antenna structure is formed by the feeding radiation element, the first radiation element, the shorting radiation element, the second radiation element, the third radiation element, and the fourth radiation element;

wherein the feeding radiation element comprises a first portion and a second portion, and an obtuse angle is formed between the first portion and the second portion.

2. The mobile device as claimed in claim 1, wherein the first radiation element further comprises a trapezoidal widening portion.

3. The mobile device as claimed in claim 2, wherein a first coupling gap is formed between the second portion of the feeding radiation element and the trapezoidal widening portion of the first radiation element.

4. The mobile device as claimed in claim 3, wherein a width of the first coupling gap is from 0.5 mm to 1.5 mm.

5. The mobile device as claimed in claim 1, wherein a second coupling gap is formed between the first portion of the feeding radiation element and the third radiation element.

6. The mobile device as claimed in claim 5, wherein a width of the second coupling gap is from 0.5 mm to 1.5 mm.

7. The mobile device as claimed in claim 1, wherein a third coupling gap is formed between the second portion of the feeding radiation element and the fourth radiation element.

8. The mobile device as claimed in claim 7, wherein a width of the third coupling gap is from 0.5 mm to 1 mm.

9. The mobile device as claimed in claim 1, wherein the antenna structure covers a first frequency band, a second frequency band, and a third frequency band.

10. The mobile device as claimed in claim 9, wherein the first frequency band is from 2400 MHz to 2500 MHz, the second frequency band is from 5150 MHz to 5850 MHz, and the third frequency band is from 5925 MHz to 7125 MHz.

11. The mobile device as claimed in claim 9, wherein a total length of the first radiation element and the shorting radiation element is substantially equal to 0.25 wavelength of the first frequency band.

12. The mobile device as claimed in claim 9, wherein a total length of the first radiation element, the shorting radiation element and the second radiation element is substantially equal to 0.5 wavelength of the second frequency band.

13. The mobile device as claimed in claim 9, wherein a length of the feeding radiation element is substantially equal to 0.5 wavelength of the third frequency band.

14. The mobile device as claimed in claim 9, wherein a length of the fourth radiation element is substantially equal to 0.25 wavelength of the third frequency band.

* * * * *